June 28, 1932.  J. A. McEACHERN  1,865,328
ROAD MACHINE
Filed Dec. 17, 1930    2 Sheets-Sheet 1

WITNESS

INVENTOR
John A. McEachern
BY
ATTORNEY

Patented June 28, 1932

1,865,328

UNITED STATES PATENT OFFICE

JOHN A. McEACHERN, OF HOMER, LOUISIANA

ROAD MACHINE

Application filed December 17, 1930. Serial No. 503,064.

This invention relates to road machines, and it has particular relation to a road drag designed to be suspended at varying elevations beneath a truck and to the elevating mechanism therefor which is carried by the truck and is operable from the cab thereof.

An object of the invention is the provision of a device of this character which is equally effective in operation upon forward and rearward movement of the truck.

Another object of the invention is the provision of a device of this character wherein the drag is yieldingly suspended, whereby it is free to tilt upon engagement thereof with irregularities in the roadbed.

Still another object of the invention is to provide a road machine wherein the drag is free to move longitudinally but not laterally with respect to the truck.

The invention consists further in certain novel features of construction, and in the combination and arrangement of the several parts, to be hereinafter fully described, illustrated in the accompanying drawings, and specifically pointed out in the appended claims.

For a better understanding of the invention, reference may now be had to the accompanying drawings, forming a part of the disclosure, wherein:

Figure 3 is an enlarged detail view, partially in section and partially in elevation, illustrating the portion of the operating mechanism which is disposed in the cab of the truck; and Figure 4 is a fragmentary detail view, in perspective, of a portion of the frame of the drag.

Figure 1:
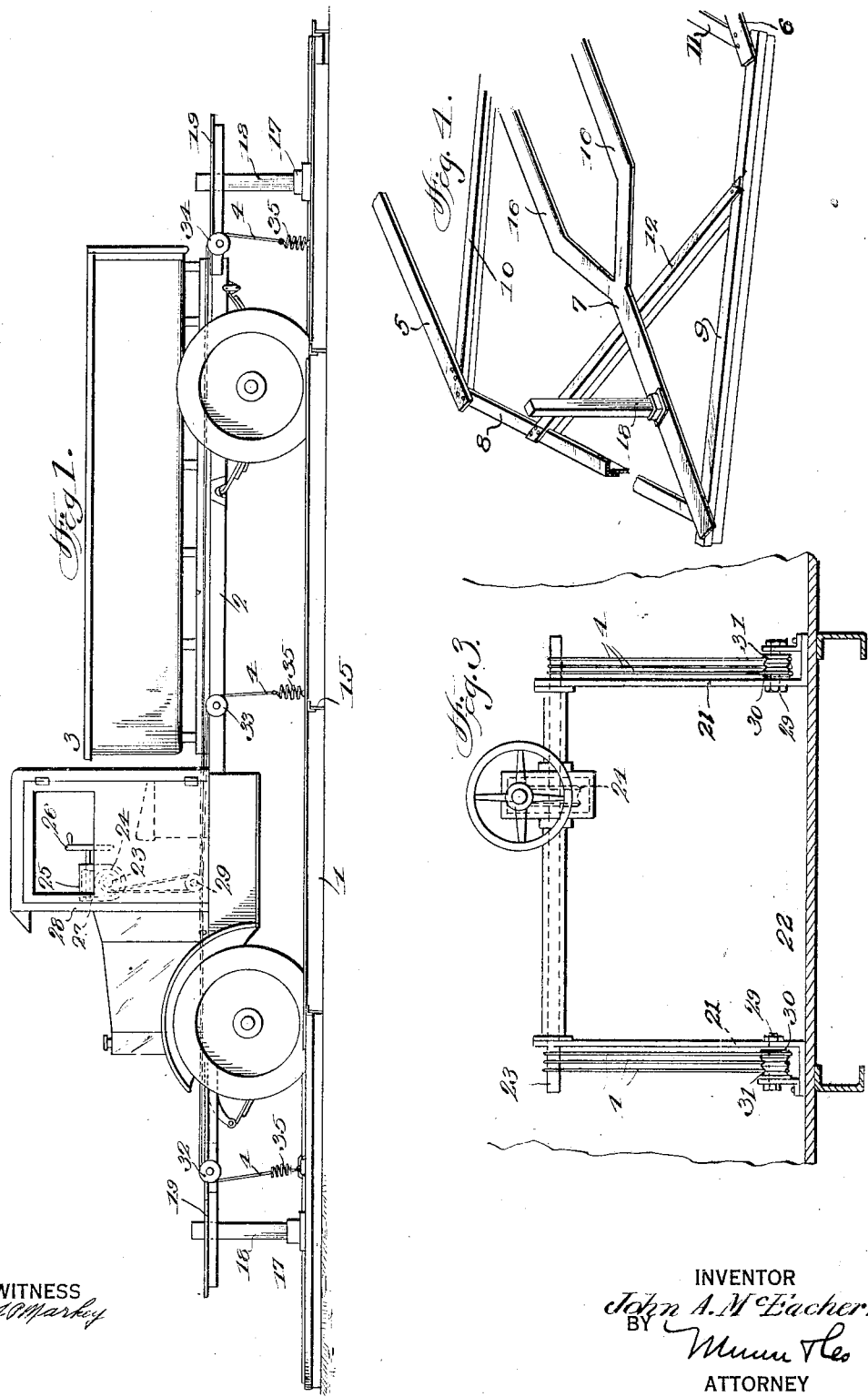
Figure 1 is a side elevational view of a truck equipped with road grading mechanism in accordance with this invention.
Figure 2:
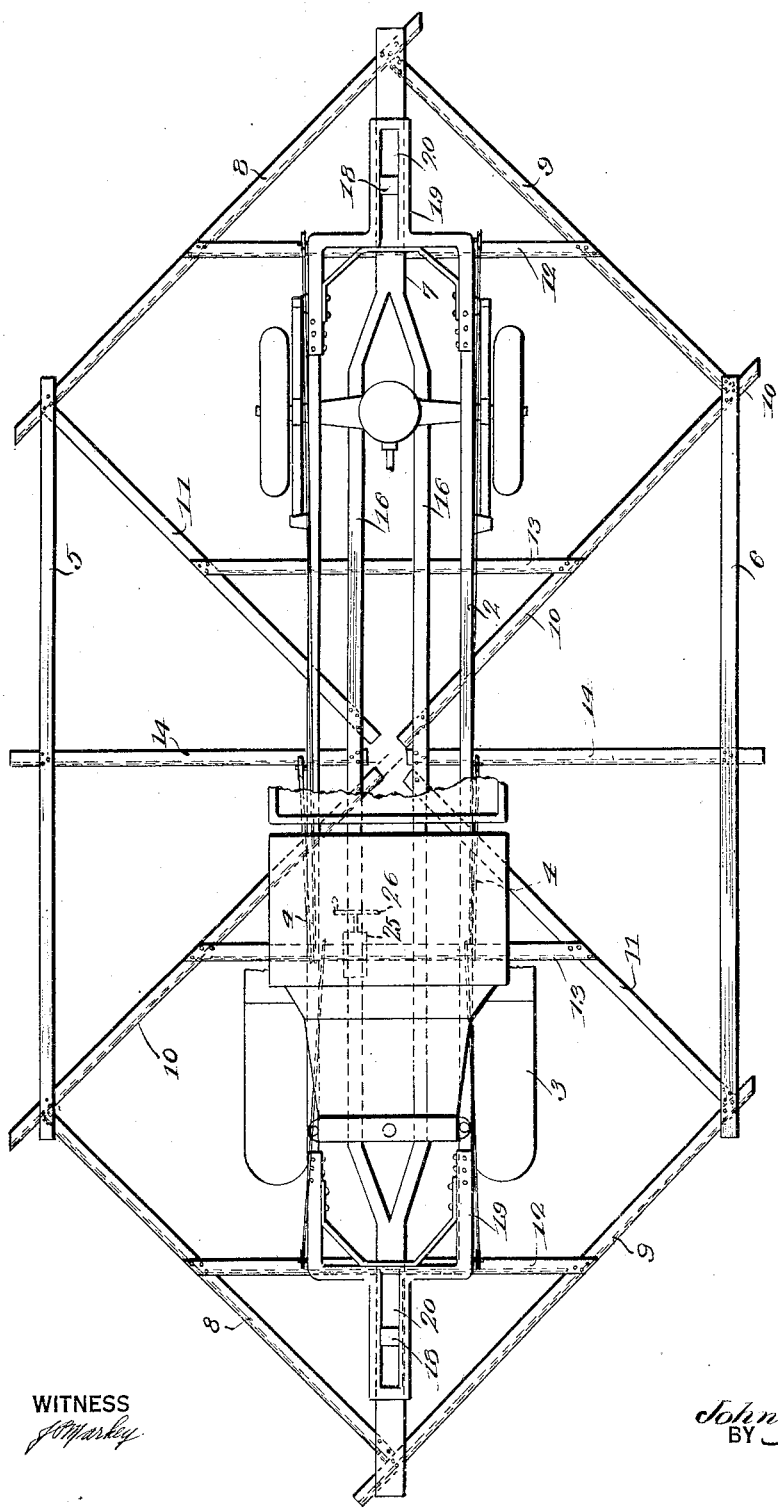
Figure 2 is a plan view thereof, parts being broken away to illustrate hidden parts and other hidden parts being shown by dotted lines.

In the embodiment of the invention illustrated in the accompanying drawings the drag proper comprises a frame 1 of substantially hexagonal shape, preferably constructed of heavy angle iron or steel, which is adapted to be suspended at varying levels beneath the chassis 2 of a motor truck 3 by means of cables 4.

As shown, the frame 1 comprises three longitudinal stringer bars 5, 6, and 7 to the under side of which are welded or bolted angle bars 8, 9, 10, 11, 12, 13, and 14, each of which has bolted thereto a drag blade 15. In order to permit raising the frame 1 nearer to the chassis 2 of the truck than would otherwise be possible, the member 7 is split with the portions 16 thereof spread in spaced parallel relation and, if desired, the portions 16 may be curved downwardly in the region of the axles of the truck 3 to permit still higher raising of the frame 1. Obviously two continuous members crossing at their centers may be utilized, in place of the four members 10, 11, as shown, although the latter construction is preferably. Collars 17 are provided adjacent each end of the member 7 for the reception of posts 18 which are removably fitted and bolted therein.

Similar frames 19 are attached to the front and rear ends of the chassis 2 and are shaped to provide slots 20 for the reception of posts 18. It will be noted that this construction permits limited longitudinal movement but no lateral movement of the frame relative to the chassis.

A pair of upstanding brackets 21 bolted to the floor at the cab 22 rotatably support a shaft 23 adjacent their upper ends. A worm gear 24 is keyed to the shaft 23 and meshes with a worm 25 manually operable by means of a hand wheel 26 fixed to the end of the shaft on which the worm 25 is bolted. Preferably, and as shown, the worm 25 and worm gear 26 are housed within a casing 27 secured to the dash 28 of the cab.

At the base of each bracket 21 is mounted a shaft 29 upon each of which is rotatably mounted a double sheave 30 and a single sheave 31. Similar single sheaves 32, 33, and 34 are rotatably mounted on the chassis 2 or on the extension frames 19 which are in effect continuations of the chassis at each side thereof at the front, center, and rear respectively. The shaft 23 serves as a wind up for the six cables 4 by means of which the frame is elevated.

As shown, the ends of the cables 4 are secured to the shaft 23 and extend downwardly about the sheaves 30 and 31 and thence to the sheaves 32, 33, or 34, as the case may be, and downwardly to the frame 1, springs 35 being attached to the frame and to the cables 4 in order that the frame may at all times be yieldingly supported. It will be noted that the four cables 4 which extend to the center and rear of the frame pass about the double sheaves 30 whereas the cables 4 extending to the front of the frame pass about the single sheave 31 so that upon rotation of the hand wheel 26 uniform elevating or lowering force is applied to the front, center, and rear of the frame 1.

From the foregoing description it is evident that a road drag has been provided which is capable of performing the functions ascribed thereto. The yieldable mounting of the frame permits the front end thereof to tilt upwardly upon engagement with an obstacle thus permitting the rearwardly disposed blades 15 to function. The whole device is designed for use at comparatively high speed, that is, at fifteen miles per hour or faster which is impossible with any such device heretofore produced.

To assemble the drag or frame 1 with a truck 3 it is only necessary to position the frame upon the ground with the parts 18 removed and drive the truck thereover until the desired relative positions are obtained after which the cables 4 and springs 35 may be attached to the frame.

Attention is directed to the fact that the device may be utilized until such time as the blades 15 become dull when the frame may be reversed in position with respect to the truck so as to bring the other side of the blades into action upon forward movement of the truck. This may become necessary due to the fact that most of the work is done with the truck moving in a forward direction although the device is equally effective during forward or backward movement of the truck.

Although I have illustrated only one form which the invention may assume and have described that form in detail, it will be apparent to those skilled in the art that the invention is not so limited but that various minor modifications may be made therein without departing from the spirit of my invention or from the scope of the appended claims.

I claim:

1. A road drag comprising a truck, and a drag frame supported from said truck and extending forwardly and rearwardly thereof, guide means between the forward and rear ends of said truck and said frame and arranged in a manner that the latter is freely movable longitudinally with respect to the truck, and means for raising and lowering said frame.

2. The device as set forth in claim 1, wherein the said raising and lowering means are flexible and are operable from the operator's position on said truck.

3. The device as set forth in claim 1, wherein resilient couplings are employed for connecting said raising and lowering means to said frame.

4. A road drag comprising a truck, a drag frame supported from said truck and extending forwardly and rearwardly thereof, longitudinally slotted members projecting forwardly and rearwardly of said truck, guides rising vertically of said frame and engaged in the said slots whereby the frame is freely movable longitudinally with respect to the truck, and means for raising and lowering said frame relatively to said truck.

5. The device as set forth in claim 4, wherein the said frame extends entirely about the outer side of said truck and has its front and rear ends pointed in the plane of the longitudinal center of the truck whereby to be operative upon movement of the latter in either direction.

6. A road drag comprising a truck, a drag frame extended entirely about said truck, sheaves mounted about the outer side of said truck, flexible members trained over said sheaves for raising and lowering said frame relatively to the truck, resilient coupling members interposed between said flexible members and said frame, slotted guides extending forwardly and rearwardly of the front and rear ends of said truck, guide members rising from said frame and engaged in said slotted guides, said guides having the slots therein elongated in the plane of the longitudinal center of said truck to allow limited horizontal movement of said guide members therein, and means adjacent the operator's position on said truck for operating said flexible members.

JOHN A. McEACHERN.